(12) United States Patent
Breitbach

(10) Patent No.: US 10,609,669 B2
(45) Date of Patent: Mar. 31, 2020

(54) DEVICES AND METHODS FOR OPERATING A COMMUNICATION NETWORK

(71) Applicant: Deutsche Telekom AG, Bonn (DE)

(72) Inventor: Markus Breitbach, Bonn (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 16/064,553

(22) PCT Filed: Dec. 23, 2016

(86) PCT No.: PCT/EP2016/082516
§ 371 (c)(1),
(2) Date: Jun. 21, 2018

(87) PCT Pub. No.: WO2017/109154
PCT Pub. Date: Jun. 29, 2017

(65) Prior Publication Data
US 2019/0028991 A1   Jan. 24, 2019

(30) Foreign Application Priority Data

Dec. 23, 2015 (DE) .................. 10 2015 122 790
Dec. 23, 2015 (EP) ...................... 15202554

(51) Int. Cl.
*H04W 84/12* (2009.01)
*H04W 60/00* (2009.01)
(Continued)

(52) U.S. Cl.
CPC ......... *H04W 60/005* (2013.01); *H04W 24/02* (2013.01); *H04W 84/12* (2013.01); *H04W 88/10* (2013.01)

(58) Field of Classification Search
CPC ... H04W 60/005; H04W 24/02; H04W 84/12; H04W 88/10; H04W 12/00516; H04W 12/04
See application file for complete search history.

(56) References Cited

U.S. PATENT DOCUMENTS

| 7,792,538 | B2 * | 9/2010 | Kozisek ................ H04W 12/06 370/310 |
| 10,028,132 | B2 | 7/2018 | Choi et al. |

(Continued)

FOREIGN PATENT DOCUMENTS

| EP | 2496050 A1 | 9/2012 |
| JP | 2006186941 A | 7/2006 |

(Continued)

OTHER PUBLICATIONS

3GPP TR 22.891 V1.1.0 (Nov. 2015), 3rd Generation Partnership Project; Technical Specification Group Services and System Aspects; Feasibility Study on New Services and Markets Technology Enablers; Stage 1 (release 14), Nov. 2015, pp. 1-95.

*Primary Examiner* — Marisol Figueroa
(74) *Attorney, Agent, or Firm* — Leydig, Voit & Mayer, Ltd.

(57) ABSTRACT

A method for operating a communication network having a base station includes associating the base station with a first sub-network of the communication network and operation of the first sub-network of the communication network by a management entity, wherein the base station is configured to communicate with a first set of communication terminals during operation of the first sub-network. The method further includes associating the base station with a second sub-network of the communication network and operation of the second sub-network of the communication network by the management entity, wherein the base station is config- (Continued)

ured to communicate with a second set of communication terminals during operation of the second sub-network.

13 Claims, 2 Drawing Sheets

(51) Int. Cl.
*H04W 24/02* (2009.01)
*H04W 88/10* (2009.01)

(56) References Cited

U.S. PATENT DOCUMENTS

| | | |
|---|---|---|
| 2006/0046730 A1 | 3/2006 | Briancon et al. |
| 2009/0059878 A1 | 3/2009 | Tamura |
| 2012/0088472 A1 | 4/2012 | Pison |
| 2013/0094486 A1* | 4/2013 | Bhanage ............... H04W 88/08 370/338 |
| 2014/0031042 A1* | 1/2014 | Smiley .............. H04W 72/0453 455/438 |
| 2016/0043998 A1* | 2/2016 | Wang .................. H04L 63/0272 726/15 |
| 2017/0164349 A1* | 6/2017 | Zhu ....................... H04W 48/18 |
| 2018/0359644 A1* | 12/2018 | Shimizu ................ H04W 16/10 |
| 2019/0174498 A1* | 6/2019 | Samdanis ............. H04W 16/10 |

FOREIGN PATENT DOCUMENTS

| | | |
|---|---|---|
| JP | 2009055381 A | 3/2009 |
| WO | WO 2015083911 A1 | 6/2015 |
| WO | WO 2015105985 A1 | 7/2015 |
| WO | WO 2015178035 A1 | 11/2015 |

\* cited by examiner

DEVICES AND METHODS FOR OPERATING A COMMUNICATION NETWORK

CROSS REFERENCE TO RELATED APPLICATIONS

This application is a U.S. National Stage Application under 35 U.S.C. § 371 of International Application No. PCT/EP2016/082516 filed on Dec. 23, 2016, and claims benefit to German Patent Application No. DE 10 2015 122 790.8 filed on Dec. 23, 2015, and European Patent Application No. EP 15202554.0 filed on Dec. 23, 2015. The International Application was published in German on Jun. 29, 2017, as WO 2017/109154 A1 under PCT Article 21(2).

FIELD

The invention relates to devices and methods for operating a communication network having at least one base station, particularly at least one WLAN base station.

BACKGROUND

Information and communication technologies have become a firmly established part of everyday life in private households. Activities such as communicating, searching for information, shopping, or ordering goods via the Internet have become standard practice for many people. The Internet is often accessed via a home gateway or a comparable device, which serves as an interface for all networks and bus systems that exist in the private household. To enable wireless communication, particularly with the mobile communication terminals that exist in a private household, such a home gateway comprises a WLAN base station (also called a WLAN access point) or is connected to one.

Another frequently utilized option for accessing the Internet are the so-called "WiFi hotspots", which typically are public wireless WiFi base stations which are available to everyone (as the case may be against payment of a fee). WiFi hotspots are installed both in public spaces (libraries, hospitals, airports, railway stations, etc.) and in private spaces, e.g. restaurants, cafes, hotels, etc.

It is foreseeable that the number of (mobile) terminals which can communicate via a mobile radio network and/or a WiFi network will increase dramatically in the near future, wherein these communication terminals will, in addition to "classic" mobile telephones, also include "smart" devices such as sensors, cameras, traffic infrastructure, and similar devices, which are part of the "Internet of Things". Handling the associated communication volume constitutes an enormous challenge for existing mobile radio network structures.

SUMMARY

In an embodiment, the present invention provides a method for operating a communication network having a base station. The method includes associating the base station with a first sub-network of the communication network and operation of the first sub-network of the communication network by a management entity, wherein the base station is configured to communicate with a first set of communication terminals during operation of the first sub-network. The method further includes associating the base station with a second sub-network of the communication network and operation of the second sub-network of the communication network by the management entity, wherein the base station is configured to communicate with a second set of communication terminals during operation of the second sub-network.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
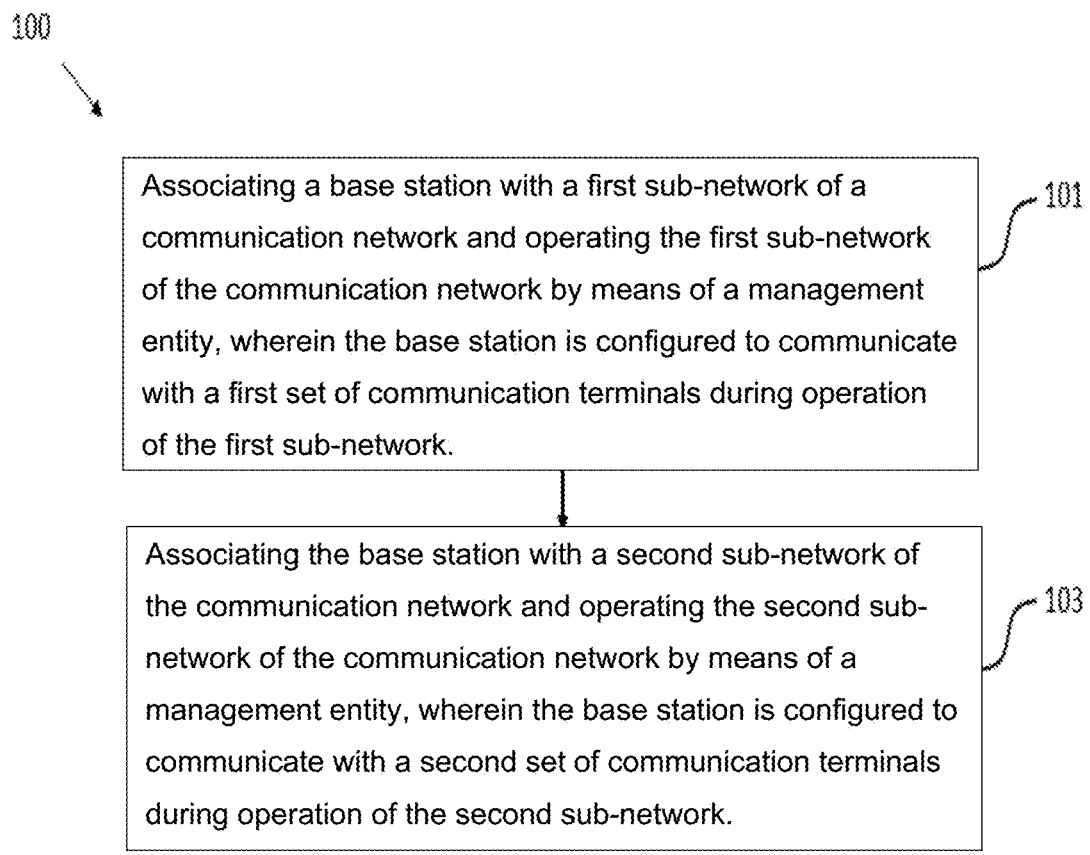
FIG. 1 is a schematic representation of a method for operating a communication network having a base station according to an embodiment of the invention.

Embodiments of the present invention provide improved devices and methods for operating a communication network.

According to embodiments of the invention, methods for operating a communication network having a base station are provided. The methods include associating the base station with a first logical sub-network of the communication network and operating the first sub-network of the communication network by means of a management entity, wherein the base station is configured to communicate with a first set of communication terminals during operation of the first sub-network; and associating the base station with a second logical sub-network of the communication network and operating the second sub-network of the communication network by means of the management entity, wherein the base station is configured to communicate with a second set of communication terminals during operation of the second sub-network. The base station can be configured as a WLAN base station, particularly a WiFi base station.

In an embodiment, the first logical sub-network and the second logical sub-network are slices of the communication network. The term "network slice" or "network slicing" describes a concept for operating multiple logical networks as virtually independent, that is, logically decoupled units on a common physical network infrastructure. In this respect, a network slice is an independent virtual end-to-end network, which from a user's point of view behaves like a physical network, including a business logic and network management capabilities.

In an embodiment, either the first sub-network or the second sub-network of the communication network is operated at a point in time, that is, in this embodiment the base station is either part of the first logical sub-network or part of the second logical sub-network of the communication network.

In an embodiment, the method further includes the step of switching over from the operation of the first sub-network of the communication network to the operation of the second sub-network of the communication network, wherein the step of switching over is performed by means of the management entity.

In an embodiment, the first sub-network and the second sub-network of the communication network can be operated in parallel, that is, in this embodiment the base station is at the same time part of the first logical sub-network and part of the second logical sub-network of the communication network.

In an embodiment, the communication network comprises an access network which allows access to the Internet for the first set of communication terminals during the operation of the first sub-network and access to the Internet for the second set of communication terminals during the operation of the second sub-network.

In an embodiment, the base station uses a first wireless network standard during operation of the first sub-network of the communication network for communication with the first set of communication terminals and a second wireless network standard for communication with the second set of communication terminals during operation of the second sub-network of the communication network.

In an embodiment, the base station has a different radiation characteristic during operation of the first sub-network of the communication network than during operation of the second sub-network of the communication network.

In an embodiment, the base station has a different downlink data capacity or uplink data capacity during operation of the first sub-network of the communication network than during operation of the second sub-network of the communication network.

In an embodiment, the base station, during operation of the second sub-network of the communication network, has access to a database which is associated with the second sub-network, wherein identification, address, or access information, particularly IMSI, IMEI, eID, or eUICC, of at least one communication terminal of the second set of communication terminals is stored in the database.

In an embodiment, the base station is secured by a first access key during operation of the first sub-network and is secured by a second access key during operation of the second sub-network.

According embodiments of the invention, base stations for a communication network are provided, wherein the base stations are configured to be associated with a first sub-network of the communication network or a second sub-network of the communication network, wherein the base stations are configured to communicate with a first set of communication terminals during operation of the first sub-network and to communicate with a second set of communication terminals during operation of the second sub-network.

According to embodiments of the invention, management entities are provided for operating a communication network having a base station, wherein the management entities are configured to associate the base station with a first sub-network of the communication network and to operate the first sub-network of the communication network, wherein the base station is configured to communicate with a first set of communication terminals during operation of the first sub-network, and wherein the management entities are configured to associate the base station with a second sub-network of the communication network and to operate the second sub-network of the communication network, wherein the base station is configured to communicate with a second set of communication terminals during operation of the second sub-network.

The following description makes reference to the enclosed drawings, which form a part hereof and which illustrate specific embodiments in which the invention can be executed. It is understood that other embodiments can be used and that structural or logical changes can be made without deviating from the concept of the present invention. The following detailed description is therefore not to be taken in a limiting sense. It is further understood that the features of the various embodiments described herein may be combined, unless expressly otherwise specified.

The aspects and embodiments are described with reference to the drawings, wherein like reference symbols generally refer to like elements. The following description explains numerous specific details for illustration to provide a thorough understanding of one or more aspects of the invention. However, it can be obvious to a person skilled in the art that one or more aspects or embodiments can be executed with a lesser degree of the specific details. In other cases, known structures and elements are shown in schematic views to make the description of one or more aspects of the invention easier. It is understood that other embodiments can be used and that structural or logical changes can be made without deviating from the concept of the present invention.

Both devices and methods are described. It is understood that basic properties of the devices also apply to the methods and vice versa. For the sake of brevity, the same descriptions are not given twice.

FIG. 1 is a schematic representation of a method 100 for operating a communication network having a base station according to an embodiment of the invention. The method comprises associating 101 the base station with a first logical sub-network of the communication network and the operation of the first logical sub-network of the communication network by means of a management entity, wherein the base station is configured to communicate with a first set of communication terminals during operation of the first logical sub-network. The method further comprises associating 103 the base station with a second logical sub-network of the communication network and the operation of the second logical sub-network of the communication network by means of a management entity, wherein the base station is configured to communicate with a second set of communication terminals during operation of the second logical sub-network.

The method schematically shown in FIG. 1 and other embodiments will be described below with reference to FIG. 2, which shows an embodiment of a communication network 200 in which the method 100 for operating a communication network having a base station can be implemented.

Figure 2:
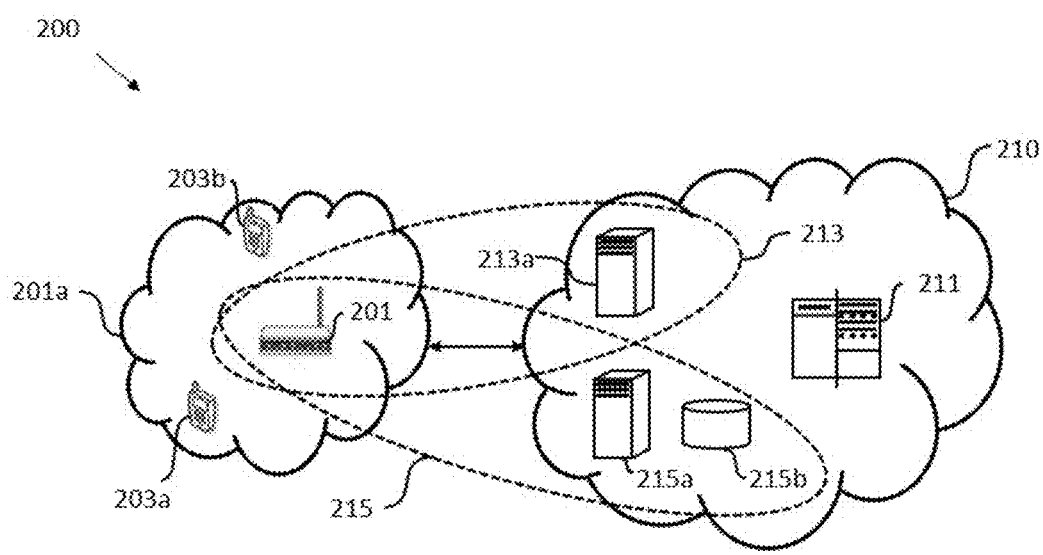
FIG. 2 is a schematic representation of a communication network in which a method for operating a communication network having a base station is implemented.

The communication network 200 shown in FIG. 2 comprises a wireless network 201*a* formed by a base station 201 and an access network 210, which enables the base station 201, for example, to access the Internet. The base station 201 can for example be a home gateway, i.e. the base station of a private household. Alternatively, the base station 201 can be part of a WiFi hotspot. The base station can for example be connected to the access network 210 via a DSL connection, cable connection, fiber optic connection or the like. The base station 201 can for example be configured to form a WiFi wireless network, a ZigBee wireless network, and/or a wireless network based on another wireless network standard.

In a default mode, the base station 201 is associated with a first logical sub-network 213 of the communication network 200 and configured to communicate with a first set of communication terminals during operation of the first logical sub-network 213, which in FIG. 2 is represented by the communication terminal 203*a*, that is, during operation of the first logical sub-network 213, the base station 201 as part of the first logical sub-network 213 allows the communication terminal 203a to access the Internet via the access network 210.

According to one embodiment, the first logical sub-network 213 is a first slice 213 of the communication network 200. The term "network slice" or "network slicing" relates to a concept for operating multiple logical networks as virtually independent, that is, logically decoupled units on a common physical network infrastructure. In this respect, a network slice is an independent virtual end-to-end network, which from a user's point of view behaves like a physical network, including a business logic and network management capabilities. For more details about network slices in the meaning of the present invention, we refer to the "NGMN 5G White Paper", particularly to Section 5.4 thereof, which can be retrieved from the "NGMN Alliance" website at "https://www.ngmn.org/home.html", and which is fully referenced here.

The first network slice 213 can for example be instantiated on a server 213a of the access network 210 and be administered by a management entity 211 in the form of a SDN controller.

For the case that the user/owner of the base station 201 temporarily has no need for using the base station 201, i.e. does not have to access the Internet with his or her communication terminals, such as the communication terminal 203a, the management entity 211 in the form of the SDN controller, according to the invention, causes the base station 201 to be associated with a second logical sub-network 215 of the communication network 200. During operation of the second logical sub-network 215 of the communication network 200, the base station 201 is configured to communicate with a second set of communication terminals, which is represented in FIG. 2 by the communication terminal 203b.

According to one embodiment, the second logical sub-network 215 is a second network slice 215 of the communication network 200. The second network slice 215 can for example be instantiated on another server 215a of the access network 210 and be likewise administered by a management entity 211 in the form of a SDN controller.

In other words: as part of the second network slice 215, the base station 201 is now configured to communicate with other communication terminals (i.e. the second set of communication terminals 203b) which are located in the communication range of the wireless network 201a of the base station 201, e.g. with M2M communication terminals in the form of sensors, cameras, traffic infrastructure, and the like. These can be any communication terminals, particularly communication terminals which do not have a password assigned by the user/owner of the base station 201, which password allows access to the first network slice 213 and via the access network 210 to the Internet during the operation of the base station 201 as part of the network slice.

As described above, the base station 201, according to the invention, is either operated as part of the first network slice 213 or as part of the second network slice 215 of the communication network 200 at one point in time. According to another embodiment, the first network slice 213 and the second network slice 215 of the communication network 200 can also be operated in parallel on the base station 201. In such parallel operation of the first network slice 213 and the second network slice 215, the user/owner of the base station 201 can for example cause the operation of the second network slice 215 on the base station 201 to be terminated by canceling the association of the base station 201 to the second network slice 215.

In one embodiment, a database 215b can be associated with the second network slice 215, i.e. with the second logical sub-network 215, of the communication network 200 which the base station 201 can access during operation of the second network slice 215 and on which identification, address, or access information of at least one communication terminal of the second set of communication terminals 203b is stored. The identification, address, or access information can for example include an IMSI, IMEI, eID, or eUICC for identification and/or a password of at least one communication terminal of the second set of communication terminals 203b for mutual authentication.

In one embodiment, the base station 201 is secured by a first access key during the operation of the first sub-network 213, which key is known to the user/owner of the base station 201, and the base station 201 is secured by a second access key during the operation of the second sub-network 215, particularly by a second access key which is known to the operator of the access network 210.

As mentioned above, switching over from the first network slice 213 (default mode) to the second network slice 215 of the communication network 200 by means of the management entity 211 in the form of an SDN controller may be performed if the user/owner does not use the base station 201, e.g. at night or when the user/owner is away from home. It is conceivable that the user/owner is given an option to define by means of a web portal at what times the base station 201 is not used. The user/owner of the base station 201 could be given an incentive for operating the base station 201 as part of the second network slice 215 by a reduction of costs for his or her Internet connection in the default mode (e.g. when the base station 201 operates as part of the first network slice 213). According to another embodiment, the management entity 211 could for example be configured to monitor the data rate(s) at which data is downloaded from or uploaded to the Internet via the base station 201 during the operation of the first network slice 213, and automatically cause a switchover to the second network slice 215 or the addition of the second network slice 215 to the first network slice 213 as soon as for a predefined period of time no data was downloaded from or uploaded to the Internet via the base station 201 as part of the first network slice 213.

In one embodiment, the base station 201 can be configured to use a first wireless network standard for communication with the communication terminals of the first set of communication terminals 203a during the operation of the first network slice 213 of the communication network 200 and to use a second wireless network standard for communication with the communication terminals of the second set of communication terminals 203b during the operation of the second network slice of the communication network 200. For example, the base station 201 can be configured to communicate with the communication terminals of the first set of communication terminals 203a during the operation of the first network slice 213 based on a WiFi wireless network standard and to communicate with the communication terminals of the second set of communication terminals 203b during the operation of the second network slice 215 based on the ZigBee wireless network standard.

In one embodiment, the base station 201 can comprise a different radiation characteristic during the operation of the first sub-network 213 of the communication network 200 than during the operation of the second sub-network 215 of the communication network 200. Such an embodiment can be used particularly advantageously for a base station 201 which is capable, for example, by means of beamforming techniques, to communicate directionally with the communication terminals in the environment of the base station 201.

In one embodiment, the base station 201 can comprise a different downlink data capacity or uplink data capacity during the operation of the first sub-network 213 of the communication network 200 than during the operation of the second sub-network 215 of the communication network 200. In other words: in one embodiment, the base station 201 can be configured to make a first maximum downlink data capacity and/or uplink data capacity available to the communication terminals of the first set of communication terminals 203a during the operation of the first sub-network 213 of the communication network 200 and to make a second maximum downlink data capacity and/or uplink data capacity available to the communication terminals of the second set of communication terminals 203b during the operation of the second sub-network 215 of the communication network 200. This embodiment allows adjustment of the downlink and uplink data capacities made available by the base station to the first network slice 213 and the second network slice 215 to the actually needed data capacities.

As described above, the embodiment of the invention is based on the basic concept to use network slices for outsourcing at least a portion of the communication volume with terminals occurring via mobile radio networks at least temporarily to the plurality of WiFi networks which is formed by the existing infrastructure of privately used WiFi base stations. It should be considered in this respect that the largest part of privately used base stations is typically not in uninterrupted use, but that instead there are longer "idle phases" (e.g. at night, during daytime when the private user is at work and/or the private user is on vacation) during which the base station and the respective WiFi network are not used.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for operating a communication network having a base station, the method comprising:

associating, by a management entity, the base station with a first slice of the communication network and operation of the first slice of the communication network, wherein the base station is configured to communicate with a first set of communication terminals during operation of the first slice;

associating, by the management entity, the base station with a second slice of the communication network and operation of the second slice of the communication network, wherein the base station is configured to communicate with a second set of communication terminals, different from the first set of communication terminals, during operation of the second slice; and switching, by the management entity, the base station from operation of the first slice to operation of the second slice based on:
  a user-defined time at which the base station is not used; or
  no data being downloaded from or uploaded to the Internet via the base station during for a predefined period of time.

2. The method according to claim 1, wherein at one point in time either the first slice or the second slice of the communication network is operated.

3. The method according to claim 1, wherein the first slice and the second slice of the communication network are operated in parallel.

4. The method according to claim 1, wherein the communication network comprises an access network which allows access to the Internet for the first set of communication terminals during the operation of the first slice and access to the Internet for the second set of communication terminals during the operation of the second slice.

5. The method according to claim 1, wherein the base station is configured as a wireless local access network (WLAN) base station.

6. The method according to claim 1, wherein the first slice and the second slice are logically decoupled from each other.

7. The method according to claim 1, wherein the base station uses a first wireless network standard during operation of the first slice of the communication network for communication with the first set of communication terminals and wherein the base station uses a second wireless network standard for communication with the second set of communication terminals during operation of the second slice of the communication network.

8. The method according to claim 1, wherein the base station has a different radiation characteristic during the operation of the first slice of the communication network relative to during the operation of the second slice of the communication network.

9. The method according to claim 1, wherein the base station has a different downlink data capacity or uplink data capacity during the operation of the first slice of the communication network relative to during the operation of the second slice of the communication network.

10. The method according to claim 1, wherein the base station, during operation of the second slice of the communication network, has access to a database which is associated with the second slice, wherein identification, address, or access information of at least one communication terminal of the second set of communication terminals is stored in the database.

11. The method according to claim 1, wherein the base station is secured by a first access key during the operation of the first slice, and the base station is secured by a second access key during the operation of the second slice.

12. A base station for a communication network, wherein the base station is configured to be associated to a first slice of the communication network and to communicate with a first set of communication terminals during operation of the first slice by a network management entity;
- wherein the base station is configured to be associated to a second slice of the communication network, and to communicate with a second set of communication terminals, different from the first set of communication terminals, during operation of the second slice by the network management entity; and
- wherein the base station is configured to be switched from operation of the first slice to operation of the second slice based on:
  - a user-defined time at which the base station is not used; or
  - no data being downloaded from or uploaded to the Internet via the base station during for a predefined period of time.

13. A management entity for operating a communication network having a base station, wherein the management entity is configured to:
- associate the base station with a first slice of the communication network and to operate the first slice of the communication network, wherein the base station is configured to communicate with a first set of communication terminals during operation of the first slice;
- associate the base station with a second slice of the communication network and to operate the second slice of the communication network, wherein the base station is configured to communicate with a second set of communication terminals, different from the first set of communication terminals, during operation of the second slice; and
- switch the base station from operation of the first slice to operation of the second slice based on:
  - a user-defined time at which the base station is not used; or
  - no data being downloaded from or uploaded to the Internet via the base station during for a predefined period of time.

* * * * *